United States Patent Office 3,131,124
Patented Apr. 28, 1964

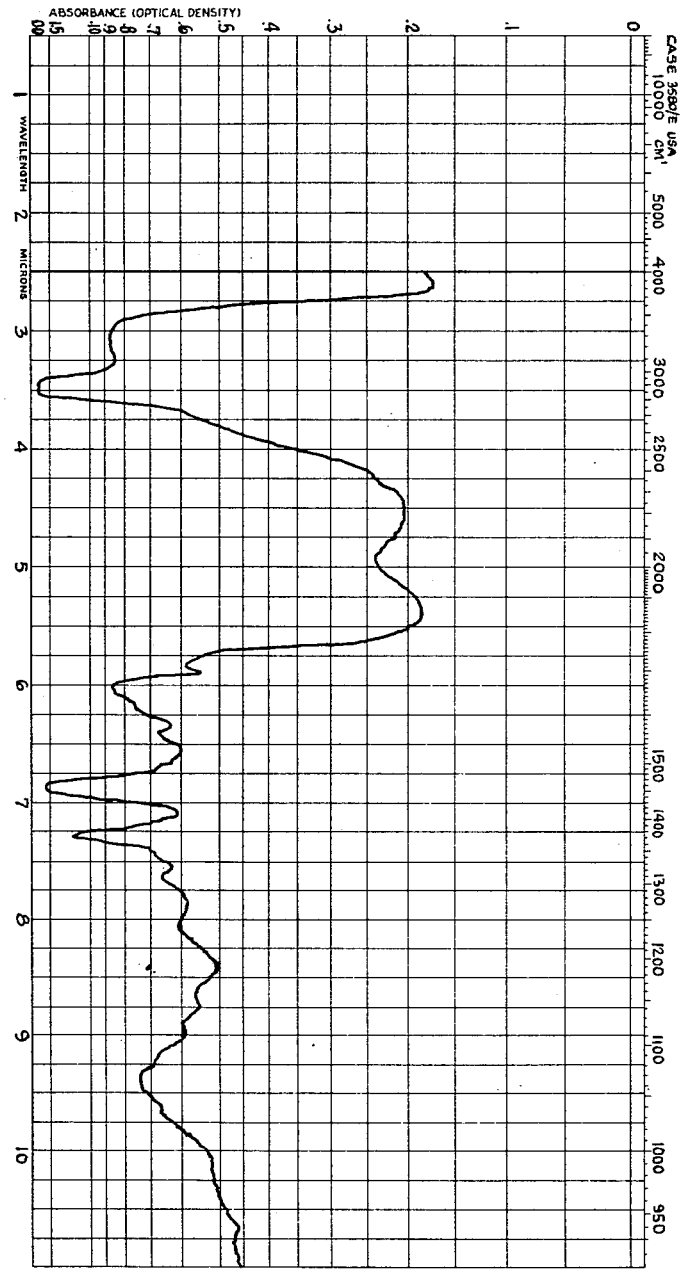

3,131,124
BAGACIDIN AND PROCESS FOR ITS
MANUFACTURE
Fritz Benz, Binningen, Ernst Gaeumann, Zurich, Lucien Neipp, Riehen, and Pierre Reusser, Arnold Stalder, and Albert Wettstein, Basel, Switzerland, assignors to Ciba Corporation, a corporation of Delaware
Filed June 12, 1957, Ser. No. 673,993
Claims priority, application Switzerland June 15, 1956
14 Claims. (Cl. 167—65)

This invention provides a new water-soluble antibiotic having basic properties, which is referred to hereinafter as bagacidin, and salts of this antibiotic, and also pharmaceutical preparations containing the antibiotic or a salt thereof. The invention also provides a process for the manufacture of these substances and mixtures thereof.

The antibiotic bagacidin is produced by cultivating an Actinomyces of the genus Streptomyces fradiae NRRL 2598. This strain has been isolated from a sample of soil collected at Zuoz, Canton Graubunden (Switzerland), and is kept under the name A7907 in our laboratories and also at the Federal Institute of Technology, Institut für specielle Botanik, Zurich.

*Streptomyces fradiae* NRRL 2598 forms a cinnamon-brown to reddish grey air mycelium and has conidial chains, which are a typical characteristic of the genus Streptomyces. The air mycelium has well-developed short helices with few turns. The spores are smooth. No conspicuous exopigment is formed. Media containing peptone do not assume a blackish color. The growth of the mycelium is relatively little dependent on temperature, and the mould develops well at 18° C. and also at 40° C., but the optimum temperature is between 25° C. and 32° C. In the determination by the method of T. G. Pridham and Dr. Gottlieb (J. Bacteriology, 56, 107 (1948)) the following carbon compounds are assimilated: glucose, L-arabinose, L-xylose, L-rhamnose, fructose, saccharose, inulin, D-mannitol, D-sorbitol, mesoinositol, and salicin; raffinose, on the other hand, is not consumed.

The morphological and physiological characteristics of strain NRRL 2598 are similar to those of the species *Streptomyces fradiae* (Waksman et Curtis) Waksman et Henrici.

The present invention, insofar as it includes the production of the antibiotic bagacidin, is not restricted to the use of *Streptomyces fradiae* NRRL 2598 or other strains corresponding to the description of that organism, but also includes the use of variants of these organisms such as are obtained, for example, by selection or mutation, especially under the action of ultra-violet rays of X-rays or nitrogen mustard oils.

For producing the antibiotic bagacidin a strain of *Streptomycetes fradiae* having the properties of *Streptomyces* NRRL 2598 is aerobically cultivated, for example, in an aqueous nutrient solution containing carbohydrates, nitrogenous compounds and also inorganic salts, until the solution exhibits a substantial anti-bacterial action, and then the antibiotic bagacidin is isolated therefrom.

The cultivation is carried out aerobically, for example, in a quiescent surface culture or advantageously in a submerged culture, while agitating or stirring, with air or oxygen in agitation flasks or the known fermenters. The temperature may be between 18° C. and 40° C. The nutrient solution generally exhibits a substantial antibacterial action after 1½–5 days.

As assimilable carbohydrates there may be used, for example, glucose, saccharose, lactose, starches or glycerine. As nitrogenous nutrient substances and, if desired, growth-promoting substances there may be mentioned: Amino-acids, peptides and proteins and also degradation products thereof such as peptone or tryptone, and also meat extracts, water-soluble constituents of cereal grains such as maize or wheat, or of distillation radicals from the manufacture of alcohol, of yeast, beans, especially of the soya plant, of seeds, for example, those of cotton plants, and also nitrates. Among other inorganic salts which the nutrient solution may contain there may be mentioned, for example, chlorides, carbonates or sulfates of alkali metals, alkaline earth metals, magnesium, iron, zinc or manganese.

Antibiotic bagacidin obtained by the process of this invention is a water-soluble substance which according to examination by paper chromatography consists of about 4 closely related compounds. It is completely insoluble in organic solvents, especially lipoid solvents. The antibiotic is basic and forms salts, some of which, for example, the hydrochloride, are soluble in certain organic solvents such as lower aliphatic alcohols. When cultivated in an aqueous medium the antibiotic is almost entirely present in the nutrient solution, and the mycelium separated from the solution exhibits practically no biological activity.

Owing to the aforesaid property organic solvents cannot be used to extract the antibiotic bagacidin from a culture solution. On the contrary, it can be extracted under neutral or weakly alkaline conditions with adsorption agents and extracted from the adsorbate with an acid elutriating liquid, advantageously having a pH value below 4. As adsorption agents there may be used, on the one hand, active carbons, for example activated carbon sold under the trademark Norit, and on the other, cation-exchangers, namely those which contain carboxyl groups such as, for example, the exchange resin sold under the trademark Amberlite IRC–50.

When active carbon is used as adsorption medium, there may be used as elutriation liquids either aqueous acid solutions or acid-containing solvents which are miscible with water, such as lower aliphatic alcohols or ketones. A mixture of equal parts by volume of methanol and 1 N-formic acid has been found especially advantageous. Owing to the fact that the active carbon adsorbs from the culture solution, in addition to the antibiotic, large quantities of impurities, some of which are colored, the adsorption column is washed, prior to elutriation of the antibiotic but under otherwise unchanged conditions, advantageously with ethanol whereby a large part of the accompanying substances is removed and the antibiotic is not extracted. From the acid elutriate a highly concentrated preparation of the antibiotic can be obtained in the form of a white powder by concentrating the elutriate in vacuo to a small volume, whereby the organic solvent and the greater part of the formic acid are removed, and then the aqueous concentrate, advantageously after being diluted with 4–5 times its volume of methanol, is mixed with acetone, the precipitate so formed is washed with this solvent and finally dried. Since the carbon elutriate, especially one obtained from cultures prepared with a nutrient solution containing calcium carbonate, contains considerable amounts of calcium ions, it is preferable to precipitate the calcium with oxalic acid before the antibiotic is precipitated from the concentrate.

For the adsorption of the antibiotic it is of advantage to use a cation-exchanger in the H-form. The elutriation is carried out with a dilute aqueous acid, if desired, after first washing the column with distilled water, whereby inactive accompanying substances are eliminated. As elutriating agent 0.2 N-hydrochloric acid is especially suitable. The antibiotic is present in the elutriate in the form of a salt. Cation-exchanger elutriates can be used as such or after being concentrated in vacuo, and if desired after neutralization, to prepare further enriched preparations of the antibiotic.

In order to obtain the pure antibiotic bagacidin from a purified preparation obtained by adsorption with carbon or an ion-exchanger the preparation is mixed in the form of an aqueous solution adjusted to a pH value of 6.5 to 7.0 with a proportion by volume of an aqueous solution of a salt of an azo-dyestuff containing sulfonic acid groups sufficient to bring about complete precipitation, and the resulting sparingly soluble dyestuff salt of the antibiotic is isolated. By using as the azo-dyestuff salt the sodium salt of 4'-dimethylamino-azobenzene-4-sulfonic acid known in commerce under the name helianthin or Orange III, the dyestuff salt (helianthate) of the antibiotic bagacidin separates out wholly or partially in crystalline form. The helianthate of the antibiotic can be recrystallized from water or methanol or a mixture of water and methanol, or from formamide and water. Macroscopic recrystallization yields a red-brown powder. When examined under the microscope, the crystals are yellow laminated plates or rods, which melt at 186–188° C. with decomposition.

In order to recover the antibiotic from its dyestuff salt, the latter is reacted in an aqueous or alcoholic medium with a salt of an inorganic or organic acid with an organic base, whereby there are formed the salt of the antibiotic with the acid used and the dyestuff salt of the base used. By using, for example, triethylamine sulfate for this reaction and carrying out the latter with an aqueous suspension of the helianthate of the antibiotic there are obtained the water-soluble sulfate of the antibiotic and the insoluble helianthate of triethylamine. By adding a sufficient amount of methanol to the reaction solution the insoluble helianthate of triethylamine dissolves and the sulfate of the antibiotic, which is soluble only in water and is completely insoluble in lower alcohols, precipitates and can be isolated, for example, by filtration. Alternatively, the reaction may be carried out in an alcoholic or aqueous-alcoholic solution, in which case the sulfate precipitates immediately and can be separated from the dyestuff solution. The sulfate of the antibiotic bagacidin so obtained is a colorless powder having a highly antibiotic activity, which is easily soluble in water and formamide but is insoluble in organic solvents such as alcohols and ketones.

From the sulfate of the antibiotic its hydrochloride, for example, can be obtained in the form of an almost colorless powder, which is easily soluble in water and methanol but sparingly soluble in ethanol, by reacting the sulfate in aqueous solution with barium chloride and isolating the hydrochloride from the solution after removing the barium sulfate. Alternatively, the hydrochloride may be prepared directly from the helianthate of the antibiotic by adding to a solution or suspension of the helianthate in methanol an excess of concentrated hydrochloric acid or of a solution of gaseous hydrochloric acid in methanol, and precipitating the hydrochloride formed with ether and isolating it. In order to remove small amounts of colored impurities from the hydrochloride prepared in this manner, a methanolic solution of the hydrochloride is filtered through a column of active carbon, advantageously gas black, and, after evaporating the solvent from the filtrate, the hydrochloride is obtained in the form of a pure white powder, which can be obtained partially in a crystalline form by causing it to separate from an aqueous or methanolic solution by very slow evaporation. The crystals decompose at 188–190° C.

The preparation of antibiotic bagacidin in a pure form can also be carried out by precipitating it from aqueous solution in the form of a sparingly soluble salt with an organic acid e.g. of the type of picric acid, such as picric acid itself or styphnic acid or with picrolonic acid. Whilst the picrate and styphanate are obtained in the form of amorphous precipitates which could not be crystallized till now—the styphante is liquid at room temperature—the picrolonate has been obtained as a crystalline substance. The yellow needles which are combined in clusters melt, after sintering, at 213–214° C. with decomposition. These salts which are slightly soluble in water may be converted into inorganic salts by treatment with an inorganic acid, for example, hydrochloric acid or sulfuric acid, in an aqueous medium or in a solvent miscible with water, such as methanol or acetone, the inorganic salts may be isolated as such. By this method of concentration the antibiotic can be obtained, for example, from the sulfate purified by way of its helianthate, or from an elutriate used for washing a carbon adsorbate or cation-exchange adsorbate. Other crystalline salts of the antibiotic bagacidin which are difficultly soluble in water are the reineckate which crystallizes in irregular plates and decomposes at 189° C. and the diliturate salt of 5-nitrobarbituric acid). The latter forms crystals in polyhedron form or needlelike crystals in clusters which, on being heated to over 190° C., gradually become colored and sinter together, without however showing any proper melting or decomposition point.

The free base of the antibiotic bagacidin can easily be obtained from its salts, for example, from its sulfate by reaction in an aqueous medium with barium hydroxide, neutralization of the excess of baryta with carbon dioxide and separation of the barium carbonate and barium sulfate precipitate, and isolation of the antibiotic base by freeze drying. The free base can also be obtained in a more simple manner from its salts by the use of a strongly basic anion-exchanger, for example, the HO-form of the product known in commerce under the name "Dowex-2."

The antibiotic bagacidin is a colorless amorphous base which is easily soluble in water and aqueous media and is insoluble in organic solvents. An aqueous solution of the base has an alkaline reaction. A solution of 1 percent strength of the product produced with the aid of an ion-exchanger has a pH value of 10.5.

The antibiotic bagacidin forms with acids salts of which, for example, the colorless sulfate and hydrochloride are very easily soluble in water. The hydrochloride is also soluble in lower aliphatic alcohols, especially methanol. By very slowly evaporating an aqueous or methanolic solution of the hydrochloride of the antibiotic, the hydrochloride can also be obtained in crystalline form. The crystals decompose, after sintering, at 188–190° C. The hydrochloride of the antibiotic bagacidin has the following elementary analysis: C=39.5%, H=7.2%, N=15.5%, O=19.8% and Cl=17.2%. Its specific rotation $[\alpha]_D^{20}=+21°$. (c.=0.8 in water).

The sulfate of the antibiotic could not be obtained in a crystalline form till now.

The dyestuff salt of the base with 4'-dimethylamino-azobenzene-4-sulfonic acid (the helianthate) is sparingly soluble in aqueous and also in alcoholic media. From hot saturated solutions in such media platelets separate which under the microscope are yellow colored, irregular and laminar, and which decompose at 186–188° C. after recrystallization.

Other salts of the antibiotic bagacidin can be obtained, for example, from acetic acid, palmitic acid, succinic acid, citric acid and pantothenic acid.

It has been found by infra-red spectral examination, and color reactions and from the elementatry composition that antibiotic bagacidin has the character of a polypeptide. The infrared spectrum exhibits bands inter alia at $3.0\mu$, $3.45\mu$, $4.95\mu$, $5.85\mu$, $6.05\mu$, $6.40\mu$, $6.87\mu$, $7.28\mu$, $7.65\mu$, $8.10\mu$, $8.90\mu$, $9.37\mu$ for the hydrochloride suspended in Nujol as may be seen from the diagram. Comparative examination by paper chromatography shows that it differs from the known water-soluble, colorless antibiotics streptomycin, streptothricin and neomycin which are active against gram-positive and gram-negative bacteria. Notwithstanding the similarity of the strain *Streptomyces fradiae*, strain NRRL 2598 which produces the new antibiotic with the organism *Streptomyces xanthophaeus* Lindenbein which produces the antibiotic geomycin and the very similar elementary constitution of the hydrochloride of antibiotic bagacidin with that of the hydrochloride of geomycin (see H. Brockmann and H. Musso, Naturwissenschaften, vol. 41, page 451 (1954), Chemische Berichte, vol. 87, page 1779 (1954)) antibiotic bagacidin is not identical with geomycin, as the former, in contradistinction to the latter, exhibits no ninhydrin reaction and also an extremely weak color reaction by the method of Sakaguchi. On the other hand, as distinct from geomycin, it exhibits a strong biuret reaction, which geomycin lacks. The maltol reaction is negative.

Antibiotic bagacidin is also not identical with the water-soluble polypeptide, cinnamycin, which is produced by the *Streptomyces cinnamoneus* Benedict, Pridham and Lindenfelser which also resembles *Streptomyces fradiae*, strain NRRL 2598, since cinnamycin contains sulfur in its molecule and is active only against gram-positive bacteria and not against gram-negative bacteria.

Antibiotic bagacidin has a high antibiotic activity against various test organisms. By using as test methods in vitro series of dilutions to the power of 10 in glucose broth with incubation periods of 24 hours at 37° C., the following inhibiting concentrations were obtained:

| Test organism: | Inhibiting concentration |
|---|---|
| *Micrococcus pyogenes*, var. *aureus* | 10 |
| *Micrococcus pyogenes*, var. *aureus*, penicillin-resistant | 100 |
| *Streptococcus pyogenes* | 100 |
| *Streptococcus viridans* | 100 |
| *Corynebacterium diphtheriae* | 1 |
| *Escherichia coli* | 100 |
| *Escherichia coli*, streptomycin-resistant | 100 |
| *Escherichia coli*, chloromycetin-resistant | 100 |
| *Salmonella typhosa* | 10 |
| *Salmonella schottmuelleri* | 10 |
| *Shigella sonnei* | 100 |
| *Pseudomonas aeruginosa* | 100 |
| *Klebsiella* type A | 100 |
| *Pasteurella pestis* | 100 |
| *Vibrio cholerae* el Tor | 100 |
| *Bacillus megatherium* | 1 |
| *Bacillus subtilis* | 10 |
| *Candida vulgaris* | 10 |
| *Endomycese albicans* | 10 |

Antibiotic bagacidin is also active in vivo. When administered subcutaneously six times to mice infected with *Escherichia coli* at the rate of 50 milligrams per kilogram of body weight 100 percent of the injected mice survived. When mice infected with *Klebsiella* type A were given similar doses the same activity was found, and an effect was also observed in the case of mice infected with *Salmonella typhimurium*.

The toxicity of the antibiotic is low. Thus, for example, mice tolerated the subcutaneous administration six times of 50 milligrams per kilogram body weight without suffering harm. Higher doses have not been tested.

The antibiotic and salts thereof are useful as medicaments, for example, in the form of pharmaceutical preparations. These preparations contain the antibiotic or a salt thereof in admixture with a pharmaceutical organic or inorganic carrier suitable for enteral, parenteral or local administration. For preparing the carrier there are used substances which do not react with the new compounds, for example, gelatin, lactose, starches, magnesium stearate, talc, vegetable oils, benzyl alcohols, gums, polyalkylene glycols, white petroleum jelly, cholesterol or other known carriers for medicaments. The pharmaceutical preparations may be made up, for example, as tablets, dragees, powders, salves, creams, suppositories or in liquid form as solutions, suspensions or emulsions. If desired they may be sterilized and/or may contain auxiliary substances, such as preserving, stabilizing, wetting or emulsifying agents. They may also contain another therapeutically valuable substance. The following examples illustrate the invention:

Example 1

*Streptomyces fradiae* NRRL 2598 is cultivated by the submersion method. For this purpose there is used a nutrient solution which contains, per liter of tap water, the following substances:

| | Grams |
|---|---|
| Lactose | 10 |
| Soya bean meal | 10 |
| Sodium chloride | 5 |
| Sodium nitrate | 1 |
| Calcium carbonate | 10 |

The nutrient solution is sterilized in an inoculation flask or in fermenters for 20–30 minutes at 1 atmosphere gauge pressure. The sterilized nutrient solution has a pH value of 7.5 to 8.0.

Inoculation is carried out with up to 10 percent of a partially sporulated vegetative culture of the organism. Incubation is carried out at 27° C. while agitating or stirring well, during which the cultures in fermenters are aerated with about 1 part by volume of sterile air per volume of solution per minute. After 70–120 hours of incubation the culture solution attains its highest inhibiting action against the test organisms (*B. subtilis*, *B. megatherium*, *Staph. aureus*, *Esch. coli*, *Candida vulgaris*); the culture is interrupted and the inactive mycelium and other solid constituents are separated from the solution containing the antibiotic by filtering or centrifuging, and, if desired, about 1 percent of a filtration assistant, for example, Hyflo Super-Cel, is added to the culture solution before filtration. The pH value of the culture filtrate, as compared with that of the sterilized nutrient solution, usually remains unchanged or only slightly changed.

By using, instead of the aforesaid nutrient solution, a solution containing, per liter of tap water, any one of the mixtures of nutrient substances given under (*a*) to (*f*) below, similar culture filtrates of high antibiotic activity are obtained by incubation and working up in an analogous manner. Instead of adding Hyflo Super-Cel or another filtration assistant of this kind, rapid filtration can be achieved by adjusting the pH value of the culture solution with hydrochloric acid to 5 before it is filtered and adding an aqueous solution of aluminum sulfate of 0.5 percent concentration.

The mixtures of nutrient substances added, per liter of water, are as follows:

(*a*)

| | Grams |
|---|---|
| Glucose | 10 |
| Soya bean meal | 10 |
| Sodium chloride | 5 |
| Sodium nitrate | 1 |

(*b*)

| | |
|---|---|
| Glycerine | 20 |
| Soya bean meal | 10 |
| Sodium chloride | 5 |
| Sodium nitrate | 1 |
| Sodium carbonate | 10 |

(*c*)

| | |
|---|---|
| Glucose | 10 |
| Soya bean meal | 10 |
| Corn steep liquor | 20 |
| Sodium chloride | 5 |
| Sodium nitrate | 1 |
| Calcium carbonate | 10 |

(*d*)

| | |
|---|---|
| Glucose | 10 |
| Peptone | 5 |
| Meat extract (Oxo Lab Lemco) | 3 |
| Sodium chloride | 5 |
| Calcium carbonate | 10 |

(e)

| | Grams |
|---|---|
| Glucose | 10 |
| Casein | 3 |
| Secondary potassium phosphate | 2 |

(f)

| | |
|---|---|
| Starch | 10 |
| Peptone | 4 |
| Dried yeast | 1 |
| Secondary potassium phosphate | 2 |

A filtrate or centrifugate obtained as described above from a culture of *Streptomyces fradiae* NRRL 2598 usually has a pH value of 7.5 to 8. If this is not the case, the pH value is brought to that figure by means of 10 N-caustic soda solution for the subsequent enrichment of the new antibiotic. 1 percent of active carbon (Norit) is added to the weakly alkaline filtrate in order to adsorb the antibiotic and the mixture is stirred mechanically for one hour, during which the whole of the antibiotically active substance is taken up by the carbon. The carbon is separated from the completely inactive almost water-clear solution by filtration, advantageously with the addition of a small amount of a filtration assistant, such, for example, as Hyflo Super-Cel.

The carbon adsorbs, in addition to the antibiotic, a large amount of other organic antibiotically inactive substances, principally strongly colored degradation products from the nutrient solution and also inorganic salts. These accompanying substances are advantageously removed from the carbon before the antibiotic is elutriated. For this purpose the still moist carbon mass which has been filtered off is introduced into 5 times its quantity of ethanol of 95 percent strength and the suspension is stirred for ½ hour. The carbon washed in this manner can easily be separated from the washing liquid by filtration. The brown colored filtrate exhibits no antibiotic activity.

The new antibiotic is elutriated by means of acidified aqueous methanol, advantageously with a mixture of equal parts by volume of methanol and 1 N-formic acid, 2 cc. of the elutriation liquid being used for each gram of adsorption medium. The suspension is mechanically stirred well for ½ hour, then filtered, and the carbon residue is extracted three times in the same manner. The elutriates, of which only the first is weakly yellow in color and the others are colorless, exhibit the whole of the antibiotic activity. They are combined and concentrated in vacuo at a low bath temperature, for example, 40–60° C., to 1/100 of their original volume, during which the greater part of the formic acid, in addition to the methanol and a large amount of water, is removed. The pH value of the yellowish but thinly liquid concentrate is usually about 4.

The concentrate, especially when the culture is carried out as described in the first paragraph of this example or with the nutrient mixtures (*b*) to (*d*), contains large amounts of calcium. The latter is removed in the form of its sparingly soluble oxalate by adding to the concentrate an aqueous solution of oxalic acid of 10 percent strength while stirring. The quantity of oxalic acid solution necessary for the complete precipitation is accurately determined in an aliquot part. For concentrates from cultures obtained as described in the first paragraph or with nutrient mixtures (*b*) to (*d*) there are usually required between 300 and 500 cc. of oxalic acid solution per liter of concentrate, which corresponds to 3–5 cc. per liter of original culture filtrate, whereas concentrates from culture solutions prepared without the addition of calcium carbonate require smaller amounts.

From the concentrate which has been freed from calcium the antibiotic is obtained in the form of a highly concentrated white powder by first diluting the aqueous concentrate with 4–5 times its volume of methanol, and then precipitating the active material with 20 parts by volume of acetone. The precipitate is filtered off, washed twice with acetone and finally freed from residues of solvent in vacuo. There is obtained a pure white powder which exhibits almost the whole of the antibiotic activity of the culture filtrate. The yield ranges from 300–500 milligrams per liter of culture filtrate.

*Example 2*

A substantially greater enrichment of the antibiotic bagacidin than that obtained by precipitation with acetone as described in Example 1 can be brought about by the method involving the preparation of its crystalline salt with helianthin. For this purpose the calcium-free concentrate obtained as described in Example 1 is diluted with 2 parts by volume of water the pH value of the solution is adjusted to 6.7 to 7.0 by means of 10 N-caustic soda solution, and there is added in the form of a thin stream, while stirring vigorously, the volume of an approximately saturated aqueous solution of helianthin required for complete precipitation, and containing 3.5 grams of helianthin (Orange III, sodium salt of 4'-dimethylamino-azobenzene-4-sulfonic acid) per liter, the precipitation solution being advantageously introduced directly into the antibiotic solution. The volume of the helianthin solution required for complete precipitation is determined by a preliminary test with an aliquot amount of the solution. It usually ranges from 50–150 times the quantity of the undiluted concentrate used, depending on the content of antibiotic. The helianthate (helianthin salt of of the antibiotic) thus formed precipitates for the greater part in a crystalline condition in the form of thin small rods and/or platelets. The precipitation solution is allowed to stand for a few hours at a low temperature, about 0° C., during which the precipitate settles out completely. The greater part of the clear supernatant liquid is then removed by decantation, and the remainder is separated by centrifuging it from the precipitate. The latter is washed once with about its own quantity of ice cold water and then isolated with suction. The washing is repeated twice in the same manner, but with acetone. The helianthate of the new antibiotic washed in this manner is then dried in vacuo. The yield amounts to between 40 and 70 milligrams of helianthate per cc. of concentrate. The dry product is a red-brown powder. It is rather sparingly soluble in water and in methanol, more easily soluble in formamide, but insoluble or very slightly soluble in lipoid solvents such as acetone, ether, benzene, chloroform or the like. It can be recrystallized from water or methanol or a mixture of these two solvents, and it is obtained in the form of platelets which under the microscope are yellow, irregular and laminar and melt at 186–188° C. with decomposition.

In order to prepare the sulfate of the new antibiotic from its helianthate, for example, 10 grams of the helianthate in the form of a dry powder are suspended in 50 cc. of water, 16 cc. of an aqueous solution of 80 percent strength of triethylamine sulfate are added to the suspension, and the mass is stirred for one hour, during which the mass gradually becomes red-violet in color due to the formation of the sparingly soluble triethylamine salt of helianthin. The reaction can be considerably accelerated by heating. 20 parts by volume of methanol are then added to the reaction mixture, whereby the sulfate of the antibiotic precipitates out as a white precipitate and the triethylamine helianthate dissolves. The antibiotic sulfate obtained by centrifuging or filtration is freed from adherent dyestuff by reprecipitating it twice from water by means of methanol, and finally washing it with pure methanol and then drying it. It is a pure white amorphous powder which is insoluble in organic solvents but dissolves easily in water. About 1 gram of the sulfate is obtained from 10 grams of the crude antibiotic helianthate.

*Example 3*

In order to convert the sulfate into the hydrochloride of the new antibiotic, which chloride is easily soluble in water and in methanol, the sulfate is dissolved in 10 times its quantity of water and the aqueous solution is treated with a barium chloride solution of 20 percent strength until precipitation is complete, for which purpose about 2 cc. of solution per gram of sulfate are required. The precipitated barium sulfate is removed by centrifuging, and the hydrochloride is isolated from the colorless supernatant solution by freeze drying. About 0.8 gram of the hydrochloride is obtained per gram of sulfate. In order to further purify the hydrochloride, the latter is dissolved in a small amount of methanol, the concentrated solution is poured on to a chromatographic column of gas black washed with methanol, and elutriation is carried out with the same solvent. The evaporation residue of the elutriate is a pure white powder easily soluble in methanol and in water, and which separates from such a solution partially in a crystalline form when the solvent is evaporated very slowly. The crystals decompose, after sintering, at 188–190° C.

Instead of preparing the hydrochloride by way of the sulfate, the hydrochloride can be obtained directly from the helianthate. For this purpose the helianthate is suspended in a dry finely dispersed condition in about 10 times its weight of absolute methanol, 2 parts by volume of a 10 N-solution of hydrochloric acid in methanol are added to the suspension, and the whole is then boiled for a short time. After decolorizing the solution with a small amount of Norit, the water-clear filtrate is then concentrated in vacuo to about one quarter of its original volume, and the hydrochloride is precipitated from the concentrate by means of 10–20 parts by volume of ether or acetone.

*Example 4*

The crude sulfate of the antibiotic obtained as described in Example 2 is purified by way of the picrate as follows:

130 cc. of a saturated aqueous solution of picric acid are slowly run into a well stirred solution of 1 gram of the sulfate in 20 cc. of water, the aforesaid quantity of picric acid solution being sufficient for complete precipitation. An oily precipitate is formed and the latter is separated by centrifuging, washed once with a small amount of saturated picric acid solution and again with water, and is then dried in a vacuum desiccator, whereby the picrate is converted into a solid but non-crystalline mass. The yield is 1.3 grams. In order to convert the picrate of the antibiotic into the hydrochloride, the picrate is dissolved with the aid of heat in methanol acidified with concentrated hydrochloric acid, and the solution is poured into 10 parts by volume of ether, whereupon the insoluble hydrochloride precipitates out in the form of a white mass. The latter is freed from adherent residues of picric acid by taking it up in a quantity of boiling methanol sufficient for dissolution and reprecipitating the hydrochloride with ether. There is obtained about 0.7 gram of pure white pulverulent hydrochloride.

*Example 5*

The pure antibiotic, e.g. as hydrochloride, can be obtained via the crystalline picrolonate instead of via the picrate which has been uncrystallizable till now.

2500 cc. of an almost saturated aqueous solution of picrolonic acid, containing 2.7 grams per liter, are added dropwise to a solution of 5.0 grams of the sulfate obtained according to Example 2 in 500 cc. of water in the course of 1 hour with stirring. The amorphous precipitate of the picrolonate is filtered with suction and dissolved in 1700 cc. of boiling water for the purpose of crystallization, and the solution is filtered hot. The picrolonate separates in partially crystalline form from the filtrate on cooling slowly to room temperature. The precipitate is collected on the filter, washed with a little ice-cold water and dissolved in 1500 cc. of boiling water for the purpose of recrystallization. From the solution filtered hot the picrolonate now precipitates in the form of fine yellow needles arranged in clusters which, after being washed with a little cold water and dried in vacuo over phosphorus pentoxide, and sintering at 205–208° C., have a sharp decomposition point of 213–214° C. The yield of the picrolonate twice recrystallized is 5.2 grams.

From the above picrolonate the pure hydrochloride is obtained by adding 3.5 cc. of a 10 N-solution of gaseous hydrogen chloride in absolute methanol in portions to a finely dispersed suspension of 5.0 grams of the picrolonate in 80 cc. of ice-cold methanol while stirring vigorously. When the reaction is complete, the formed, partially separated hydrochloride of the antibiotic is precipitated completely by adding 10 volumes of absolute ether to the reaction mixture. The hydrochloride is suction-filtered, washed with a little ether on the filter and then dissolved in 20 cc. of methanol to remove any adhering picrolonic acid residue, precipitated again with ether and washed. The pure hydrochloride of the antibiotic after being dried in vacuo is a pure white, amorphous powder. The yield is 2.2 grams.

*Example 6*

The new antibiotic can be obtained in the form of the free base either by treating its sulfate with barium hydroxide or by using a weakly basic ion-exchanger. In the former case, for example, a solution of 1 gram of the antibiotic sulfate obtained as described in Example 1 in 5 cc. of water is mixed with a slight excess of a warm saturated solution of barium hydroxide, that is to say, so that the reaction mixture has a pH value of about 9. The excess of barium hydroxide is then immediately neutralized by passing carbon dioxide into the solution. For the purpose of transforming the barium bicarbonate so formed the reaction mixture is maintained for a few minutes in a water bath at 60° C., whereupon the precipitated barium carbonate is removed together with the barium sulfate by centrifuging. From the supernatent water-clear alkaline centrifuged solution the new antibiotic is isolated in the form of the free base by freeze drying. It is a white powder soluble in water to give a strongly alkaline reaction and insoluble in organic liquids. The yield is 0.4 gram.

In order to obtain the free base with the aid of a weakly basic ion-exchanger, the procedure is a follows:

An aqueous solution of 1 gram of the crude sulfate of the antibiotic obtained as described in Example 2 of about 20 percent strength is percolated through a column of the weakly basic ion-exchanger known as Dowex-2, about 30 times the quantity of the ion-exchange resin being used which has been previously washed with dilute hydrochloric acid, water dilute caustic soda solution and water in that order. The column through which the sulfate solution has percolated is subsequently washed with water, whereby the base is easily elutriated. The elutriate is advantageously lyophylized as before in order to obtain the base. The yield is 0.7 gram.

*Example 7*

A culture solution of antibiotic bagacidin, which has been obtained as described in Example 1 and freed from mycelium, is slowly filtered through a column of a weakly acid ion-exchange resin containing carboxyl groups such, for example, as Amberlite IRC-50, 100 grams of the exchanger in the H-form being used per liter of antibiotic solution, and the speed of flow through the column being adjusted to 5–10 liters per hour. The antibiotic bagacidin is adsorbed together with inactive accompanying substances which are in part of a strong brown color. The outflowing solution having a pH value of 3 to 3.5 has only a very low antibiotic activity. The Amberlite column is then washed with a quantity of distilled water amounting the one-fifth of the volume of the filtered culture solution, whereby a part of the inactive colored accompanying substances, is removed but the antibiotic itself is not elutriated. In order to recover the latter from the adsorbate there is passed through the previously washed column an aqueous solution of 0.2 N-hydrochloric acid in a quantity amounting to a total of one-quarter of the volume of the culture solution used. The elutriate is collected in 5 equal fractions. Tests show that the greater part of the active material, namely 80–90 percent thereof, is present in the first two elutriates, and that the remaining still colored elutriates contain a relatively small antibiotic activity. The two strongly active acid elutriates are combined and neutralized either with concentrated caustic soda solution or by means of a weakly basic ion-exchanger in the HO-form. The antibiotic solution so obtained can be used as such or after being concentrated in vacuo at a low temperature as a starting solution for obtaining a more highly enriched preparation of antibiotic bagacidin, for example, as described in Examples 2, 3 or 4.

What is claimed is:

1. An antibiotic substance selected from the group consisting of the free base and salts thereof, wherein the free base is produced by cultivating *Streptomyces fradiae*, strain NRRL 2598 in an aqueous nutrient medium containing a source of carbon and nitrogen and inorganic salts under aerobic conditions at 18–40° C. until the nutrient medium exhibits a substantial antibacterial activity, then isolating the aforesaid substance from the culture filtrate, said antibiotic in the form of its base being soluble in water and insoluble in water immiscible organic solvents, and forming acid addition salts readily soluble in water with hydrochloric acid and sulfuric acid, and salts slightly soluble in water with 4'-dimethylaminoazobenzene-4-sulfonic acid, picric acid, styphnic acid, picrolonic acid, Reinecke acid and 5-nitro-barbituric acid, whose hydrochloride contains the elements carbon, hydrogen, nitrogen, chlorine and oxygen in substantially the following proportions by weight:

|  | Percent |
|---|---|
| Carbon | 39.5 |
| Hydrogen | 7.2 |
| Nitrogen | 15.5 |
| Chlorine | 17.2 |
| Oxygen | 19.8 | whose hydrochloride decomposes at 188–190° C. and, when dissolved in water, has the optical rotation $$[\alpha]_D^{20} = +21 \ (c.=0.8)$$

and, when suspended in a heavy paraffin oil exhibits absorption bands in the infrared region at 3.0μ, 3.45μ, 4.95μ, 5.85μ, 6.05μ, 6.40μ, 6.87μ, 7.28μ, 7.65μ, 8.10μ, 8.90μ, 9.37μ whose helianthate melts at 186–188° C. (with decomposition), whose picrolonate decomposes at 213–214° C. and the reineckate at 189° C.

2. The antibiotic substance according to claim 1 in the form of its base.

3. The antibiotic substance according to claim 1 in the form of its acid addition salts.

4. The antibiotic substance according to claim 3, in which the acid addition salts are of therapeutically useful acids.

5. The hydrochloride of the substance according to claim 4.

6. The sulfate of the substance according to claim 4.

7. The helianthate of the substance according to claim 4.

8. The picronolate of the substance according to claim 4.

9. The 5-nitro-barbiturate of the substance according to claim 4.

10. A process for producing a basic antibiotic substance and salts thereof which comprises cultivating *Sterptomyces fradiae*, strain NRRL 2598 in an aqueous nutrient medium containing a source of carbon and nitrogen and inorganic salts under aerobic conditions at 18–40° C. until the nutrient medium exhibits a substantial antibacterial activity, and then isolating the aforesaid substance from the culture filtrate.

11. A process according to claim 10 in which the isolated antibiotic substance is treated with an acid to form a salt thereof.

12. A process according to claim 10 according to which a salt of the antibiotic substance is converted to another salt by double decomposition.

13. A process according to claim 10 in which the helianthate is formed.

14. A process according to claim 10 in which the picrolonate is formed.

References Cited in the file of this patent

J. Antibiotics (Japan), vol. 4, p. 317, 1951.
Sneath: J. Gen. Microbiol., 17, 184–200, August 1957.
Waksman et al.: Actinomycetes and Their Antibiotics, Williams and Wilkins Co., Baltimore, 1953, p. 97.